Aug. 12, 1969　　M. P. SCHLIENGER　　3,461,214
ARC WHEEL ELECTRODE
Filed Oct. 4, 1968
FIG_1
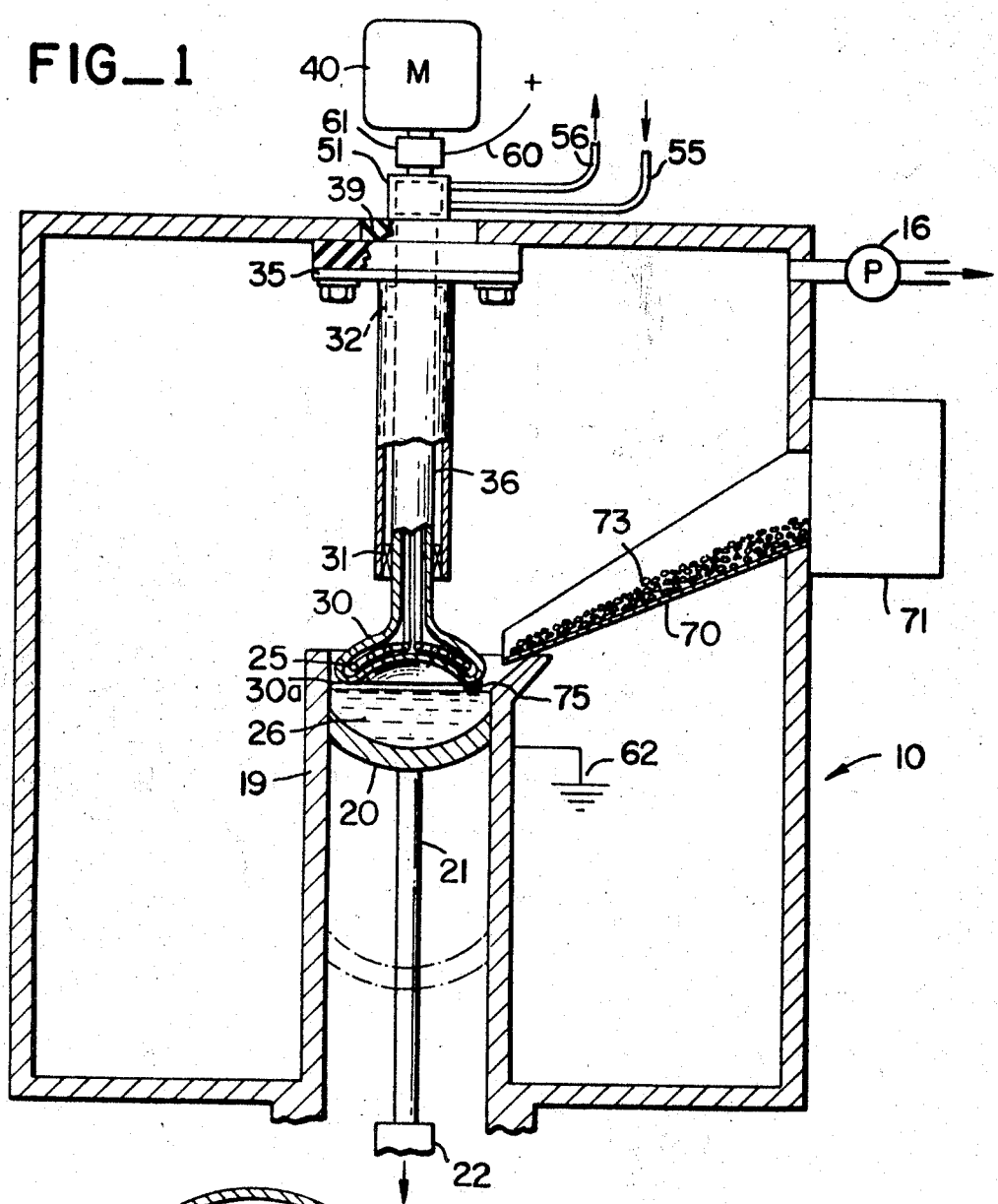
FIG_2
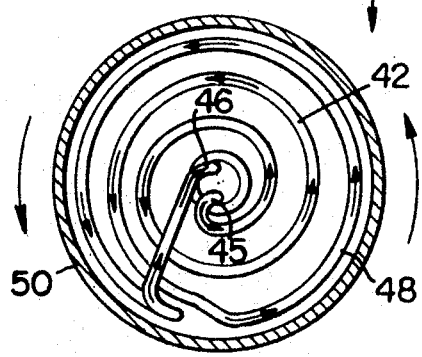
INVENTOR.
MAX P. SCHLIENGER
BY
Townsend and Townsend
ATTORNEYS

United States Patent Office 3,461,214
Patented Aug. 12, 1969

3,461,214
ARC WHEEL ELECTRODE
Max P. Schlienger, 19 Rollingwood Drive,
San Rafael, Calif. 94901
Continuation-in-part of application Ser. No. 695,937,
Jan. 4, 1968. This application Oct. 4, 1968, Ser.
No. 765,216
Int. Cl. H05b 7/08
U.S. Cl. 13—18                                    6 Claims

ABSTRACT OF THE DISCLOSURE

A nonconsumable arc furnace electrode in which the electrode is formed of a cooled wheel-like member which is rotated in a plane parallel to the surface of the melt or workpiece about an axis over the melt or workpiece to continuously change the surface portion of the periphery of the wheel-like electrode from which an arc between the electrode and melt or workpiece originates while simultaneously providing a radiation shield over the melt or workpiece.

---

This invention relates to a nonconsumable electrode for arc furnaces and is a continuation-in-part of applicant's copending application, Ser. No. 695,937, filed Jan. 4, 1968, now Patent 3,420,939, issued Jan. 7, 1969, and entitled Arc Furnace Electrode Structure.

Arc furnaces generally incorporate a melt and an electrode which is arranged to establish an arc to the melt in order to create a sufficient temperature gradient to melt materials within an evacuated atmosphere. One commonly employed technique utilizes a previously molded, consumable electrode in which the electrode itself constitutes the material which is to be melted. This technique, however, requires that the work material be previously formed in an electrode shape. In other applications where powder or sponge material is to be melted, a nonconsumable electrode must be employed to create the requisite arcs. Such nonconsumable electrodes when appropriately cooled can function to provide the arc which maintains the melt at a sufficient temperature gradient to melt the powder or granular materials being added to the melt. However, the heat at the electrode tip causes severe erosion of the tip which in the case of higher temperature applications renders such a technique difficult, if not for all intents and purposes, impossible. This is particularly true where refractory and reactive metals such as columbium, molybdenum, tungsten, zirconium and titanium are to be treated.

According to applicant's copending application, Ser. No. 695,937, these problems are overcome by providing a novel wheel-shaped electrode mounted for rotation about an axis near the melt so that only a portion of the periphery of the wheel is in arc-forming proximity to the melt. After an arc is established between the periphery of the wheel and the melt, the wheel is rotated to continuously change the surface portion of the periphery of the wheel from which the arc originates. Cooling is applied over the entire surface area of the wheel to maintain the electrode at a sufficiently low temperature to allow high temperature arc-melting to occur without electrode destruction.

According to the present invention applicant has found that an arc wheel electrode can be positioned directly over the melt for rotation in a plane parallel to the surface of the melt so that the entire circumference of the wheel is substantially the same distance from the melt. An unexpected result is that upon rotation of the wheel in the parallel plane one or more arcs are generated between the wheel and melt which tend to stay in the same position, originating from changing portions of the surface area of the rotating electrode. At the same time the arc wheel electrode provides a radiation shield over the melt.

It is, therefore, an object of this invention to provide an electrode formed of a rotating wheel mounted in a horizontal plane so that an arc forms from continually changing portions of the wheel to the melt or workpiece while at the same time the electrode provides a radiation shield over the melt or workpiece. The wheel is provided with internal water cooling so that the combination of a changing surface area electrode and cooling permits a small arc-forming area and an intense arc without destruction of the electrode.

Other objects, features and advantages of the present invention will be more apparent after referring to the following specification and accompanying drawings in which:

FIG. 1 is a diagrammatic view showing an arc furnace incorporating a principal embodiment of the present invention; and FIG. 2 is a cross-sectional view of the electrode taken at line 2—2 of FIG. 1.

Referring now to the drawings, in reference to FIGS. 1 and 2, there is provided an arc furnace 10 formed with an enclosure or housing 15 and having an evacuation pump mechanism 16 adapted to withdraw gas from the housing. By this means the interior of housing 15 can be maintained under high vacuum conditions, the exact pressure of which is determined by the materials to be worked on and the proposed purpose for their treatment. However, if desired, the melt can also be accomplished under pressure of suitable inert gases or mixtures. This is sometimes required to prevent evaporation of materials or alloy while being melted.

A cylinder 19 is vertically mounted in the interior of housing 15 in which a crucible 20 is reciprocally mounted within the cylinder. The crucible is supported by a shaft 21 and is drawn downwardly by a propulsion device 22 on demand. Thus, the upper surface 25 of melt 26 within crucible 20 can be maintained at a desired level simply by raising and lowering crucible 20 by the power device 22. As additional materials are fed to melt 26 the crucible 20 is accordingly lowered, thereby holding the upper surface 25 of melt 26 in its requisite position. The aforesaid melt-forming structure is common in the art and is illustrated in the present form for illustrative purposes only, it being understood that the invention can be combined with other forms of work supporting devices.

The electrode of the present invention is mounted over melt 26 and primarily includes an electrode wheel 30 having a projecting peripheral portion 30a about the circumference of the wheel 30. The electrode wheel is positioned horizontally over the melt 26 so that the periphery 30a of wheel 30 is substantially equally spaced from the melt around the circumference of the wheel a predetermined distance suitable for arc formation. The wheel is pivotally mounted on a vertical axis by bearings 31 and 32 carried by depending arms 33 and 34 respectively. The arms 33 and 34 are mounted to housing 15 by electrically insulated supports 35 thereby holding the bearings 31 and 32 in electrical isolation from housing 15. Electrode wheel 30 is mounted on a vertical shaft 36 which is supported by the bearings 31 and 32. Shaft 36 extends through an electrical insulating fluid-tight coupling 39 to the exterior of the housing. Shaft 36 is therein driven by a motor 40 mounted on the external end of the shaft. Thus, movement of the motor causes rotation of shaft 36 and concurrent rotation of electrode wheel 30.

The electrode wheel in its interior is formed with an electrical fluid-carrying pipe 42 having a fluid entry inlet 45 and a fluid exhaust 46 opening to the interior of shaft 36. The water cooling helix 42 is arranged with at least one full convolute 48 immediately adjacent to the periphery 50 of electrode wheel 30. Water is transmitted to and exited from helix 42 through a fluid or water intake manifold 51 mounted on shaft 36 externally of housing 15. This is accomplished through an input pipe 55 which is directed through manifold 51 into fluid communication through shaft 36 with the inlet 45 for helix 42. Exhaust is thence accomplished from the outlet or exhaust 46 of helix 42 through shaft 36, manifold 51 and thence out the exhaust pipe 56.

The water or other fluid supply system for handling the entry and the exhaust at conduits 55 and 56 as well as motor 40 is maintained in electrical isolation from housing 15.

A source of high energy electrical power is provided at electrical terminal 60 and is connected by a coupling 61 to shaft 36 for transfer of the electrical energy directly to the conductive body of electrode wheel 30. The opposite pole of the aforesaid electrical energy is connected by ground 62 to cylinder 19 thereby establishing a grounded polarity at melt 26. This obviously establishes a high energy potential difference between the electrode wheel 30 and crucible 20. The polarity of the electrode 30 and melt 26 can also be reversed with current flow from the melt to the electrode.

Materials to be melted can be fed into melt 26 by conventional means. One illustration of such is shown in FIG. 1 in which a chute 70 is fed materials through an airlock mechanism 71. The termination of the chute is arranged to drop work material shown at 73 into crucible 20.

In operation, work material 73 is fed into crucible 20 through the airlock valve 71. Pump 16 is actuated to maintain the interior of housing 15 at an appropriate vacuum. Motor 40 is energized to rotate electrode wheel 30 at an appropriate speed. Electrical energy is applied at terminal 60 and at ground 62 at sufficient intensity to cause one or more arcs 75 to be developed from a small area on the periphery of electrode wheel 30 to the top or upper surface 25 of melt 26. The arc, of course, raises the temperature to a level sufficient to cause the particles 73 to form the molten bath or melt 26. The temperature of the crucible can be regulated by air or water cooling as is known in the art. Rotation of the electrode wheel 30 continually changes the area of projecting periphery of the wheel from which arc 75 emanates. Thus while an arc is being formed from only a few degrees of the periphery 50 of electrode wheel 30, the entire periphery 50 is being cooled by the water flow through helix 42. This causes a large area for heat dissipation and a small area for arc 75 formation. At the same time the electrode wheel forms a radiation shield over the crucible and melt for maintaining the maximum temperature required in the melt.

The cross sectional contour shape of the periphery of the electrode wheel 30 and the spacing between the top surface 25 of melt 26 are determined by conventional arc furnace teachings. As the heating of melt 26 continues and the material is purified by the early evaporation of impurities and their subsequent exhaust from housing 15 the crucible 20 is thence lowered and additional material 73 is fed to the melt 26. Crucible 20 is lowered in a manner to maintain the upper surface 25 in approximately spaced arc-forming relationship to the periphery of electrode wheel 30, thus insuring a constant arc-forming spacing between the electrode and the melt.

While the subject invention is shown in combination in a furnace application for purifying and molding granular materials, it is to be understood that the electrode wheel 30 can be used with other types of furnace applications which are known in the art.

While one embodiment of this invention has been shown and described, it will be apparent that other adaptations and modifications can be made without departing from the true spirit and scope of the invention.

What is claimed is:

1. In a melting and casting arc furnace of the type having an enclosed housing providing a controlled ambient atmosphere therein and a crucible mounted in said housing in which conductive, meltable material is to be melted, the improvement comprising: a wheel having a hub portion and a circular, conductive, arc-generating periphery depending from the wheel hub portion, means rotatably mounting said wheel within said housing in a plane parallel to the surface of said meltable material about an axis to position the arc-generating periphery over the top of the crucible and material retained therein with the entire periphery of said wheel in substantially equally spaced arc-generating proximity with the meltable material in the crucible, means establishing electrical current to the periphery and the conductive, meltable material in said crucible to establish an arc between the periphery and the conductive material in the crucible of sufficient intensity to melt and liquefy the conductive, meltable material, and means rotating said wheel during application of electrical current to successively change the portion of the arc-generating periphery from which the arc originates, while said hub portion provides a radiation shield over the meltable material.

2. A melting and casting arc furnace according to claim 1 wherein feed means are provided adjacent said crucible for feeding conductive, meltable material into said crucible and means for lowering the bottom of said crucible to maintain the top surface of the conductive, meltable material in the crucible at a constant elevation to thereby maintain the top level of the conductive, meltable material in the crucible in arc-generating proximity with the arc-generating periphery of the wheel.

3. A melting and casting arc furnace according to claim 1 having a pair of fluid conduits positioned to enter and exit fluid from said electrode wheel during rotation, a third fluid conduit mounted in said wheel connected to said two fluid conduits in internal proximity to said arc-generating periphery and means supplying cooling fluid conduits to cause continual circulation of coolant fluid through said third fluid conduit.

4. In a melting and casting arc furnace of the type having an enclosed housing, means forming a controlled ambient atmosphere therein, and a crucible mounted in said housing in which conductive, meltable material is to be melted, the improvement comprising: a wheel having a circular conductive arc-generating periphery projecting downwardly from the wheel, a shaft having portions extending internally and externally of said housing, means rotatably mounting said shaft in atmosphere sealing condition at the juncture between said shaft and said housing, said wheel mounted on the portion of said shaft internally of said housing, in a horizontal plane over the top of the crucible with the entire periphery of the wheel in arc-generating proximity with the meltable material in the crucible, said wheel forming a radiation shield over the meltable material, said shaft positioned to rotate said wheel on a vertical axis to continuously change the portion of the arc-generating periphery of said wheel from which an arc originates, means establishing electrical current to the arc-generating periphery of said wheel and the conductive, meltable material in said crucible to establish an arc between the periphery of the wheel and the conductive material in the crucible of sufficient intensity to melt and liquefy the conductive material, and means rotating said wheel during application of electrical current to successively change the portion of the arc-generating periphery of the wheel from which the arc originates.

5. In a melting and casting arc furnace of the type having an enclosed housing providing a controlled ambient atmosphere and a crucible mounted in said housing in which conductive meltable material is to be melted, the improvement comprising: a conductive electrode wheel having a downwardly projecting periphery, a shaft fixedly mounted to said wheel, means pivotally mounting said shaft for rotation of said wheel in a horizontal plane about a vertical axis within said housing, fluid conduit means carried interiorly of said wheel and said shaft, means circulating cooling fluid in said conduit means during rotation of said wheel, said crucible being positioned beneath said wheel within said housing in spaced relation therefrom, means supplying conductive, meltable material to said crucible, means maintaining said meltable conductive material in said crucible in arc-generating proximity to the entire periphery of said wheel, means electrically energizing the meltable conductive material within said crucible and said wheel with opposite electrical potential to cause an arc to be developed therebetween.

6. A melting and casting arc furnace of the type having an enclosed housing forming a controlled ambient atmosphere and a crucible mounted in said housing in which conductive meltable material is to be melted, the improvement comprising: a nonconsumable electrode wheel, means electrically energizing said wheel and the conductive meltable material in said crucible to form an arc therebetween said wheel having an arc-forming periphery extending downwardly around the perimeter of said wheel, means continuously shifting the portion of the arc-generating periphery from which an arc originates by rotating said wheel while maintaining substantially the entire arc-forming periphery of the wheel in substantially equal arc generating proximity to the conductive meltable material and means mounted within said electrode to cool the entire wheel surface.

References Cited
UNITED STATES PATENTS

| | | | |
|---|---|---|---|
| 1,217,431 | 2/1917 | Foley | 219—69 |
| 2,007,225 | 7/1935 | Strobel | 219—6 |
| 2,015,415 | 9/1935 | Steiner | 219—6 |
| 2,355,838 | 12/1951 | Adcock | 219—6 |

BERNARD A. GILHEANY, Primary Examiner

H. B. GILSON, Assistant Examiner

U.S. Cl. X.R.

13—9, 31